July 14, 1925.

O. C. HARRINGTON

GUARD FOR MOTOR VEHICLES

Filed March 7, 1925

1,546,235

Inventor:
Orric C. Harrington,
by
Attys

Patented July 14, 1925.

1,546,235

UNITED STATES PATENT OFFICE.

ORRIC C. HARRINGTON, OF JACKSON, MICHIGAN.

GUARD FOR MOTOR VEHICLES.

Application filed March 7, 1925. Serial No. 13,693.

*To all whom it may concern:*

Be it known that I, ORRIC C. HARRINGTON, a citizen of the United States, residing at Jackson, in the county of Jackson and State of Michigan, have invented certain new and useful Improvements in Guards for Motor Vehicles, of which the following is a specification.

This invention has to do with improvements in guards or bumpers for motor vehicles. The invention has reference particularly to the construction and arrangement of a rear bumper for Ford cars. Said bumper at the same time serves as a fender guard and serves to strengthen and reinforce the lower portions of the fenders.

One of the objects of the invention is to provide a very simple construction and one which will be light, but rigid and durable.

Another object of the invention is to provide a construction which can be very readily applied to the chassis or underframing of a Ford car.

Another object is to provide an improved construction for connecting the end portions of the guard to the fenders.

Other objects and uses of the invention will appear from a detailed description of the same, which consists in the features of construction and combinations of parts hereinafter described and claimed.

Figure 1:
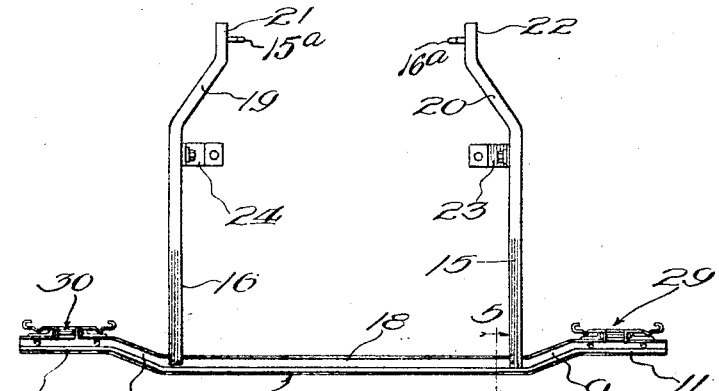
Figure 1 shows a plan view of a guard embodying the features of the present invention, the same being provided with the necessary clips for attachment to the chassis of the vehicle.

In the drawing I have illustrated the rear portion of the chassis frame by means of dotted lines. The same includes the frame side bars 5 and 6 together with the cross member 7. The side bars 5 and 6 are generally of channel section and with their open sides facing each other, as illustrated.

Figure 2:
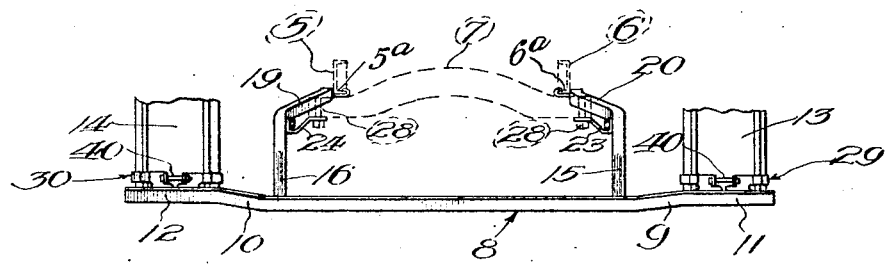
Fig. 2 shows a rear view corresponding to Fig. 1.

The guard of the present invention includes the bumper 8, preferably of T section. The central portion thereof is straight, as indicated particularly in Figs. 1 and 2; but its end portions are deflected forwardly on an angle, as shown at 9 and 10, and are then again straightened out, as shown at 11 and 12. These straightened portions 11 and 12 lie opposite to the lower portions of the rear fenders 13 and 14.

Figure 5:
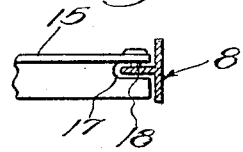
Fig. 5 shows a fragmentary detail section on the line 5—5 of Fig. 1, looking in the direction of the arrows.

Extending forwardly from the bumper bar proper are the bracket bars 15 and 16. These are preferably of angle section with one arm of the angle lying horizontally and the other arm depending vertically. Furthermore, as indicated in Fig. 5, the rear ends of the bracket bars 15 and 16 are preferably slotted, as shown at 17, to receive the forwardly projecting flange 18 of the bumper bar 8. The parts may then be riveted or bolted together, as indicated.

The bracket bars 15 and 16 preferably reach upward and forward and then have their forward portions turned inwardly towards each other, as shown at 19 and 20, so that their forward ends 21 and 22 are properly spaced to embrace the chassis frame bars 5 and 6 between them. Said front ends 21 and 22 are also deflected so that they will lie in a horizontal direction notwithstanding the upward slant of the bars 15 and 16.

Figure 4:
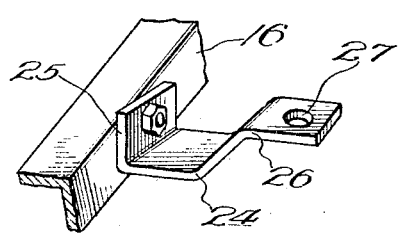
Fig. 4 shows a perspective view of one of the brackets for attachment to the side frame of the vehicle.

The bars 15 and 16 are provided with clips 23 and 24 of the general form shown in Fig. 4. Each of these has a vertical arm 25 which lies against the vertical arm of the corresponding bracket bar. It is also provided with another inwardly and upwardly extending arm 26 which reaches to such a point that a perforation 27 of said arm 26 may receive a bolt 28 which reaches down through the corresponding end of the chassis frame bar 7. I may state that these bolts are already present in the usual Ford construction and may very easily be availed of for connecting the brackets 23 and 24 in place. The extreme forward ends of the bars 15 and 16 are also provided with hooks 15ª and 16ª which are adapted to engage the lower flanges 5ª and 6ª of the chassis frame side bars 5 and 6, respectively, so as to lock the extreme forward ends of said bars 15 and 16 to the chassis frame.

Figure 3:
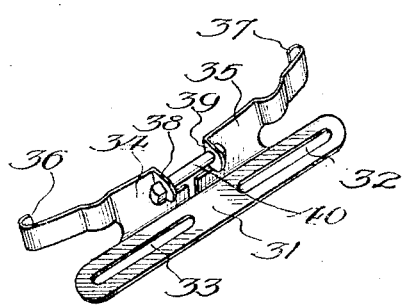
Fig. 3 shows a perspective view of one of the fender clips.

In order to connect the end portions 11 and 12 of the bumper bar 8 to the respective fenders 13 and 14, use may be made of the clips 29 and 30, one of which is illustrated in Fig. 3. Each of these clips includes a flange 31 having a pair of slotted openings 32 and 33 to receive bolts by means of which it may be adjustably connected to the flange 18 of the bumper bar. Each clip also includes a pair of upstanding lugs 34 and 35 which reach sidewise and are provided with hooks 36 and 37, respectively, adapted to engage the opposite edges of the fender. The lugs 34 and 35 are also provided with ears 38 and 39 through which is extended a bolt 40. Upon tightening up said bolt the lugs 34 and 35 are deflected towards each other a sufficient amount to lock the edges 36 and 37 firmly onto the edges of the fender, this result being possible on account of the resilient nature of the metal and the fact that it is relatively thin.

While I have herein shown and described only certain embodiments of the features of my present invention, still I do not intend to limit myself to the same, except as I may do so in the claims.

I claim:

1. The combination with the end portion of a chassis and the rear ends of the rear fenders of a motor vehicle, said chassis including inwardly facing longitudinally extending channel bars and a transverse yoke connecting said bars together, of a bumper bar and reinforcement for the rear end of said structure comprising a bar of T-shaped cross section having its web facing forwardly and its end portions adjacent to the fenders, a pair of bracket bars of angle shaped cross section having their rear ends slotted to receive the web of the bumper bar, means for securing the horizontal arms of said bracket bars to the web of the bumper bar, the bracket bars having their forward end portions deflected inwardly towards each other and lying adjacent to the rear ends of the chassis channels and also adjacent to the projecting ends of the transverse chassis yoke, means for securing the extreme forward ends of the bracket bars to the channels comprising hooks engaging the lower channel flanges, and means for securing the bracket bars to the end portions of the chassis yoke comprising brackets secured to the bracket bars and having horizontal fingers lying adjacent to the chassis yoke and bolted thereto, substantially as described.

2. The combination with the end portion of a chassis and the rear ends of the rear fenders of a motor vehicle, said chassis including inwardly facing longitudinally extending channel bars and a transverse yoke connecting said bars together, of a bumper bar and reinforcement for the rear end of said structure comprising a bar having its end portions adjacent to the fenders, a pair of bracket bars having their rear ends slotted to receive the bumper bar, means for securing the horizontal arms of said bracket bars to the bumper bar, the bracket bars having their forward end portions deflected inwardly towards each other and lying adjacent to the rear ends of the chassis channels and also adjacent to the projecting ends of the transverse chassis yoke, means for securing the extreme forward ends of the bracket bars to the channels comprising hooks engaging the lower channel flanges, and means for securing the bracket bars to the end portions of the chassis yoke comprising brackets secured to the bracket bars and having horizontal fingers lying adjacent to the chassis yoke and bolted thereto, substantially as described.

3. The combination with the end portion of a chassis and the rear ends of the rear fenders of a motor vehicle, of a bumper bar and reinforcement for the rear end of said structure comprising a bar of T-shaped cross section having its web facing forwardly and its end portions adjacent to the fenders, and means for securing each end of the bumper bar to the adjacent fender comprising a clip having a horizontal flange lying adjacent to the web of the bumper bar and longitudinally slotted, locking bolts extending through the slots of said flange and through the web of the bumper bar, a pair of upstanding lugs on said clip having their extreme end portions inwardly hooked to engage the edges of the fender, the adjacent edges of the lugs being separated from each other and provided with rearward extensions, and means for drawing said extensions toward each other comprising a tie bolt extending through them, substantially as described.

4. The combination with the end portion of a chassis and the rear ends of the rear fenders of a motor vehicle, of a bumper bar and reinforcement for the rear end of said structure comprising a bar having portions adjacent to the fenders, and means for securing each end of the bumper bar to the adjacent fender comprising a clip having a horizontal flange lying adjacent to the bumper bar and longitudinally slotted, locking bolts extending through the flange and through the bumper bar, a pair of upstanding lugs on said clip having their extreme end portions inwardly hooked to engage the edges of the fender, the adjacent edges of the lugs being separated from each other and provided with rearward extensions, and means for drawing said extensions toward each other comprising a tie bolt extending through them, substantially as described.

5. The combination with the end portion of a chassis and the rear ends of the rear fenders of a motor vehicle, of a bumper bar and reinforcement for the rear end of said structure comprising a bar having portions adjacent to the fenders, and means for securing each end of the bumper bar to the adjacent fender comprising a clip having a horizontal flange lying adjacent to the bumper bar, locking bolts extending through the flange and through the bumper bar, a pair of upstanding lugs on said clip having their extreme end portions inwardly hooked to engage the edges of the fender, the adjacent edges of the lugs being separated from each other and provided with rearward extensions, and means for drawing said extensions toward each other comprising a tie bolt extending through them, substantially as described.

ORRIC C. HARRINGTON.